United States Patent [19]

Samad

[11] Patent Number: 4,958,939

[45] Date of Patent: Sep. 25, 1990

[54] CENTERING SCHEME FOR PATTERN RECOGNITION

[75] Inventor: Tariq Samad, Minneapolis, Minn.

[73] Assignee: Honeywell Inc., Minneapolis, Minn.

[21] Appl. No.: 270,183

[22] Filed: Nov. 14, 1988

[51] Int. Cl.$^5$ ............................................... G06K 9/00
[52] U.S. Cl. ......................................... 382/35; 382/48; 358/126; 358/125
[58] Field of Search .................... 382/35, 48; 358/126, 358/125

[56] References Cited

U.S. PATENT DOCUMENTS

| | | | |
|---|---|---|---|
| 3,522,585 | 8/1970 | Lemay | 340/146.3 |
| 3,564,498 | 2/1971 | Stern | 382/35 |
| 3,769,456 | 10/1975 | Woolfson | 358/126 |
| 4,593,406 | 6/1986 | Stone | 382/44 |

Primary Examiner—Leo H. Boudreau
Assistant Examiner—Daniel Santos
Attorney, Agent, or Firm—M. B. Atlass; C. G. Mersereau

[57] ABSTRACT

The invention relates to a neural network centering scheme for translation-invariant pattern recognition. The scheme involves the centering of a pattern about its centroid to prepare it for subsequent subjugation to an associative match. The scheme is utilized in a camera assembly of the type used for image acquisition. Movement of the camera assembly is controlled in accordance with the scheme to effect the centering of a pattern in the field of view window of the camera assembly.

4 Claims, 4 Drawing Sheets

PATTERNS WITH MINIMUM FEATURE SIZES OF a) 60, b) 20, c) 2 PIXELS

THE EFFECT OF NOISE ON THE CENTERING PROCESS

THE EFFECT OF NOISE ON THE ASSOCIATIVE MATCH

CENTERING SCHEME FOR PATTERN RECOGNITION

The invention relates to a neural network centering scheme for translation-invariant pattern recognition. The scheme has two phases which are (1) the pattern is centered around its "centroid" and (2) the centered pattern is then subjected to an associative match. The invention herein relates only to the first phase.

The associative memory capabilities of neural network models have shown tremendous promise for pattern recognition applications In most real-world applications, however, recognizing patterns is a considerably more sophisticated problem than that of an associative match. In imaging processing, for example, techniques are needed to distinguish an object from its background, which may contain other objects, to recognize the same object at a different point in the image, and at a different scale and orientation. Analogous problems are encountered in other pattern recognition domains as well.

Unlike previous neural-network inspired attempts to effect translation invariant pattern recognition, the scheme of the invention herein first attempts to "center" the pattern into a canonical position and the centered pattern is then used as a recall cue to perform an associative match operation. The centering process relies on the providing of means for moving the field of view of a camera to different portions of the image on command. The centering primitives involved are operations for moving the field of view of the camera up, down, left or right one pixel at a time. A window facility of the camera may be an array of photo-sensitive elements on the focal plane of the camera and shift signals, computed from the contents of the window, serve to trigger the camera motion to provide the field of view motion.

A main object of the invention is to provide a new and improved method and apparatus for a neural network centering scheme for translation invariant pattern recognition.

Other objects and advantages of the invention will become apparent from the following specification, appended claims, and attached drawings.

THE CENTERING CONCEPT

The scheme disclosed herein does not require duplication of weights or training on the same pattern in numerous distinct locations before translation-invariant recognition can be effected. The essence of the scheme is the notion of "centering". Before a pattern can be stored or used as a recall cue for associative matching, it has to be centered at is centroid. Some pattern, set against a uniform background, is presumed to exist at some location in the image. The entire image is never visible to the matching component as the matching component can only view what is in the window. The window is initially positioned at some point in the image, but during the centering process it can be shifted to other regions of the image. Thus the window can be through of as a camera, or a "retina", and the image as a "scene". The centering process terminates when the center point of the window is at the centroid of the pattern in the image. It is assumed that some associative memory (AM) exists that uses the centered window for purposes of recognizing or classifying the pattern, or (the auto associative case) correcting the noise in the pattern.

The centering process can be thought of as analogous to "foveating" which is moving the eye so that the pattern of interest falls on the central region of the retina (the fovea).

A constraint of the required architecture is that initially some portion of the pattern, even if it is only one pixel, must be visible in the window. This constraint must be satisfied since the movement of the window is done purely on the basis of its contents, and without any knowledge of any other portion of the image. However, this constraint does not seriously impair the functionality of the scheme in that, in a pre-processing stage, the image could be rapidly scanned for activity.

There is a binary valued unit for each pixel in the window. The unit is active when the corresponding pixel is set. The units labelled right, left, up and down (collectively referred to as "shift" units) provide the signals that are used to shift the window on the image. These signals are also binary, and cause the window to be shifted in the appropriate direction by one pixel. Each of the units is connected to every pixel in the window. For right and up units, the weight from each pixel-unit is the x-coordinate and y-coordinate, respectively, of the pixel. For left and down units, it is the negative of the x-coordinate and y-coordinate, respectively.

DESCRIPTION OF AN EMBODIMENT OF THE INVENTION

Figure 1:
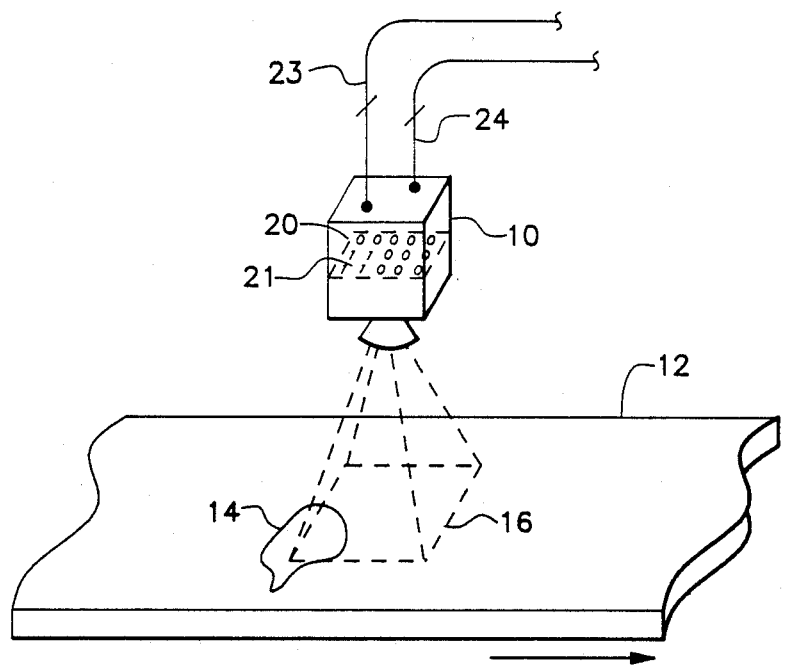
FIG. 1 shows a camera installation embodying the invention on which a moveable camera unit is directed towards a moving conveyor belt carrying an object which is to be centered in the field of view of the camera.
Figure 4:
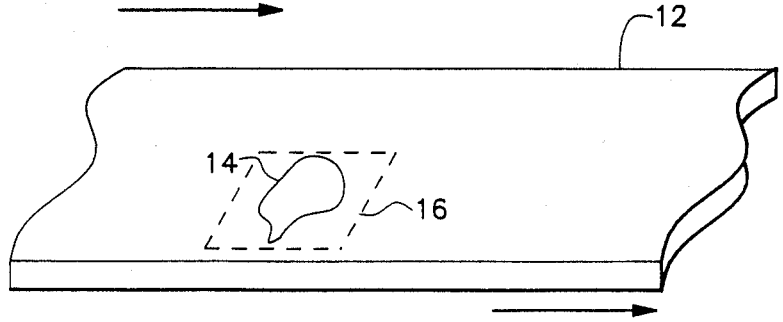

FIGS. 1 and 4 illustrate a camera installation embodying the invention in which a moveable camera unit 10 is directed towards a moving conveyor belt 12 An object 14 on the belt 12 represents a pattern which is desired to be recognized.

The camera has a field of view (FOV) 16 outlined on the belt 12 and the camera, and concomitently the FOV 16 thereof, are moveable in accordance with the invention so that at least for an instant the object 14 will be precisely centered, with reference to its center of gravity, in the FOV 16.

Figure 3:
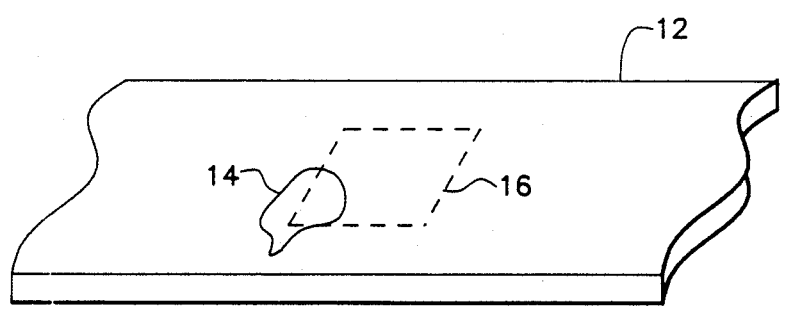
FIGS. 3 and 4 show two different positions of the conveyor belt and initial and final positions of the field of view of the camera.

FIGS. 3 and 4 illustrate the movement of the FOV 16 from an uncentered position in FIG. 3 to a centered position in FIG. 4.

In the context herein the FOV 16 is also referred to as a window and the environment, which in this case includes the upper surface of the belt 12, is referred to as an image or scene. The object 14 is considered to be a part of the image or scene and the belt surface is a plain background for the object. In this case the FOV 16 is confined to the surface of the belt 12 which is thus the only image or scene involved herein.

Camera 10 is a controllable digitizing camera which outputs a digitized array which corresponds to the area on the belt 12 encompassed by the FOV 16. The camera has a window projection 20 (shown in FIGS. 1, 2 and 5) on the focal plane thereof which comprises an array of photo-sensitive transducer elements 21 which convert sensed optical values to voltages. This array may have a corresponding window size of 256×256 pixels, for example, which would require and correspond to 65536 transducer elements 21.

Figure 2:
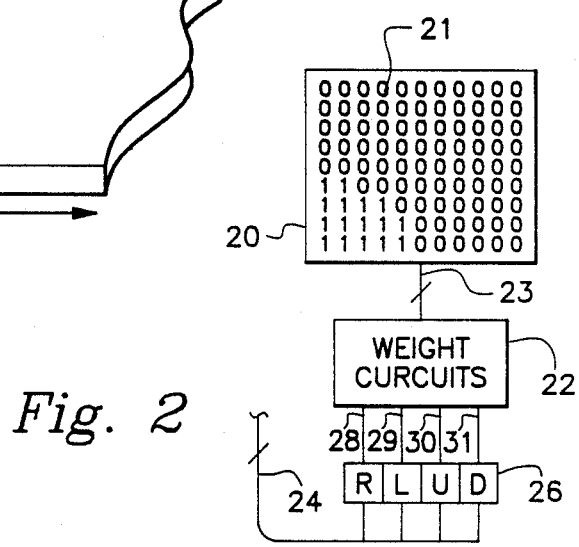
FIG. 2 is a schematic view of the focal plane of the camera of FIG. 1 and associated control apparatus for controlling the movement of the camera.

The window projection 20 has a logical matrix format which is shown schematically in FIG. 2 in the form of a "zeros" and "ones" matrix which comprises a 256×256 matrix of 65536 input units.

Weights in the form of resistors are connected to the transducer elements 21 with four weights (resistors) being provided for each element. A weight unit 22 is provided for housing the resistors which is connected to the window projection 20 in the camera 10 with a cable assembly 23 which comprises 65536 wires which respectively connect the resistors in the weight unit 22 to the transducer elements 21.

In the window projection 20 the "ones" in the lower left corner thereof (FIG. 2) schematically represent the portion of the object 14 in the corner of the FOV 16, as shown in FIGS. 1 and 3, and the "zeros" in the other parts thereof represent the visible belt surface.

Camera 10 is of a type having signal operatable controls (not shown) with four inputs for moving it in orthogonal directions so that the FOV 16 thereof is moveable laterally and transversely relative to the belt 12. The four movement control inputs are connected via a cable assembly 24 with a shift unit assembly 26 which comprises four shift units designated U, D, R and L corresponding to up, down, right and left. These shift units may have the form of comparators as will be discussed hereinafter. Each of the shift units U, D, R and L is connected via resistors in the weight unit 22 to each of the 65536 input units of the window projection 20. Cable assemblies 28, 29, 30 and 31 are provided for these connections.

Figure 5:
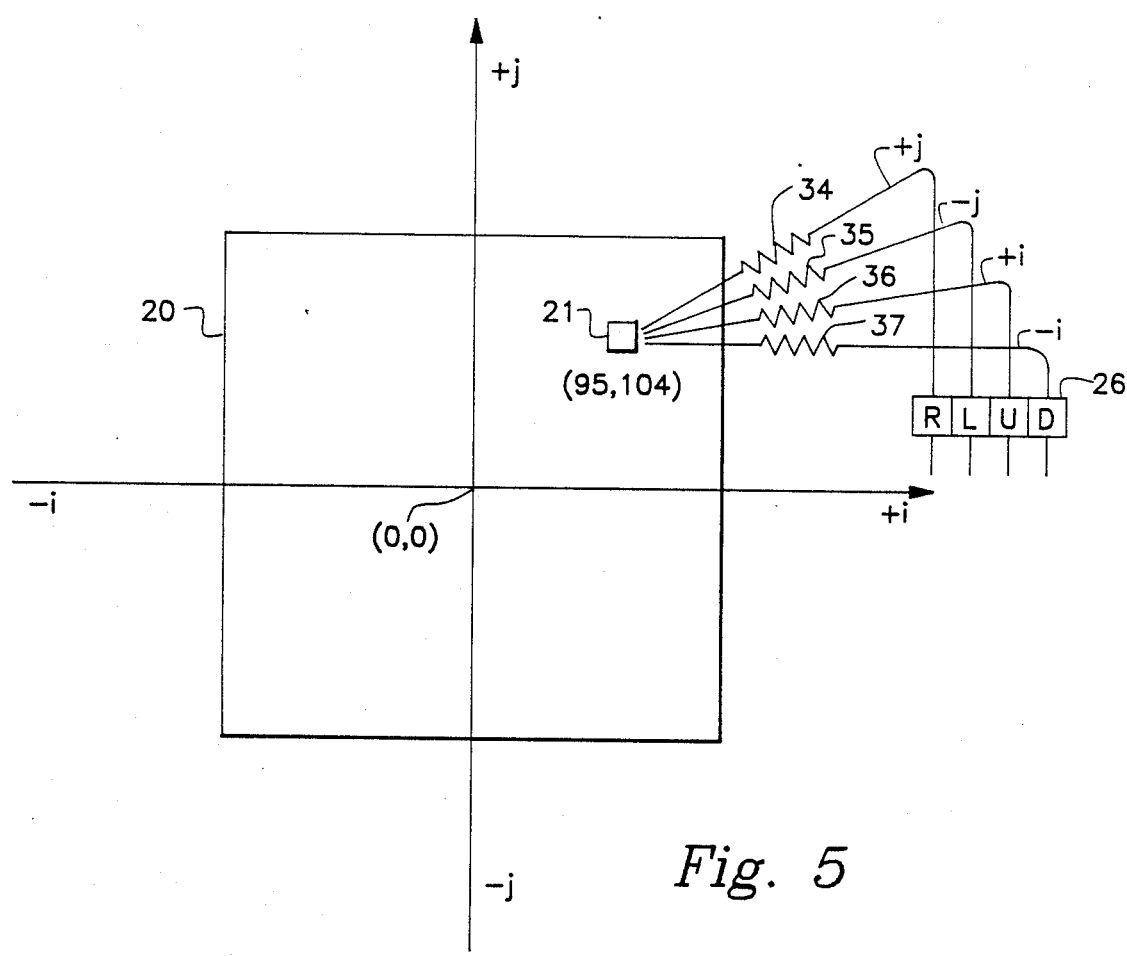
FIG. 5 is a schematic view somewhat similar to FIG. 2 showing the neural network aspects of the invention.

An outline of the window projection 20 is shown in FIG. 5 which has a Cartesian coordinates format with the origin (0,0) at the center thereof and i and j axes which correspond to conventional x and y axes.

Each pixel or transducer element 21 of the window projection 20 has a binary value which in this case will be the presence or absence of a voltage thereon. One of the pixel element 21 at coordinates (95,104) is illustrated, by way of example, as being connected to the four shift units U, D, R and L via weights or resistors 34 to 37 which are mounted in the weight unit 22. As indicated above, each of the 65536 pixel elements 21 is connected to the shift units U, D, R and L in the manner illustrated for the pixel element 21.

The multitude of connections between the pixel elements 21 and the shift units U, D, R and L are provided with fixed neural network type weights (FIG. 5) which may be, by way of example, resistors 34 to 37 of various values or some other type of electrical current regulating device. In particular the values of the weights or resistors correspond specifically to the absolute values of the coordinate values i, −i, j and −j as indicated in FIG. 5

With the construction described above the outputs of the shift units are:

$$O_{right} \text{ if } \sum_{i,j} o_{i,j} i > 0 \quad (1)$$

$$O_{left} \text{ if } \sum_{i,j} o_{i,j} i < 0 \quad (2)$$

$$O_{up} \text{ if } \sum_{i,j} o_{i,j} j > 0 \quad (3)$$

$$O_{down} \text{ if } \sum_{i,j} o_{i,j} j < 0 \quad (4)$$

Here $o_{i,j}$ is the output (nominally zero or one volt) of the transducer element 21 for the pixel at position (i,j) in the window projection 20 and the i and j factors are the values of the weights or resistors at the corresponding coordinates.

The comparison zero value on the right side of each equation is to be construed as being only nominally or theoretically zero in that, in a practical or commercial application, such value will be slightly more or less than zero due to noise or infinite oscillations between two very close points. Also, a small threshold value might be added to the right side of each equation to avoid hunting conditions which would involve endless searchings for nominal centered positions.

The belt 12 may be stationery or have any speed within the scope of the invention. The main object of the invention is the centering of the object 14 within the FOV 16 and, in the centering operation, it is necessary that at some time the object 14 must have a portion thereof, which may be as small as one pixel in area, within the boundary of the FOV 16.

With the object 14 in the position indicated in FIGS. 1 and 3, the pixel elements in the lower left corner of the window projection 20 will be set "on" and at that instant the effect of the "on" pixel elements and their associated weights will cause the D and L shift units to output positive signals pursuant to equation 2 and 4 above. These signals will be transmitted to the controls of the camera unit 10 via lines 24 and this will result in incremental movements of the FOV 16 one pixel to the left and one pixel "down" towards the near edge of the belt 12

The centering process is of course iterative relative to the incremental adjustment of the camera unit 10 and an optimal frequency of iteration can be chosen depending upon environmental conditions.

It is apparent from the above equations that the centroid of the object 14 is being computed. The object will be centered in the vertical direction when the contributions from all pixels above the center, weighted by their distance from the center, is equal to the contribution from all pixels below the center, similarly weighted Centering in the horizontal direction is an analogous operation.

A pattern would be truly centered when the shift-signals all compute to precisely zero. This can only happen, however, when the pattern is both horizontally and vertically symmetric around or relative to some pixel. Given the discreteness of of representation, the nearest the operation can come to centering is when the summations in the above equations are at their lowest absolute value. A termination criterion based on this condition would require some further extensions to the architecture which would involve a limit of closeness to absolute centering. Without any termination criterion at all, the window 16 will shift back and forth indefinitely between two positions which will be exactly one pixel apart in either direction. In actual simulations performed the centering process was terminated after a predetermined limit on the number of centering operations, or window shifts, in both directions. As the concept herein requires that the pattern be no larger than the window, and that some portion of the pattern be initially visible in the window, this limit is simply half the width or height of the window, whichever is greater. For this termination criterion to work, the centering operation cannot be sensitive to precise, or unique, centering.

Flexibility of centering is also necessary for noise-tolerance so that the simplistic termination condition is not restrictive. However, a restriction needs to be imposed on the use of this concept before the marching operation can be rendered relatively insensitive to small differences in centered positions. This restriction is that the pattern must be represented with a high resolution in the image and the minimum feature size of the pattern must be significantly larger than the minimum resolution of the image. The effect of feature size is discussed below.

EXPERIMENTS AND DISCUSSION

The concept described above has been implemented and numerous simulations have been run in which a window size of 256×256 pixels was used. Simple patterns were given to the network at various randomly determined distances from the center of the image which is the initial position of the window. The centering algorithm in all cases led to the pattern being located at the same point in the window, within one pixel in either direction, irrespective of the initial translation.

Figure 6:
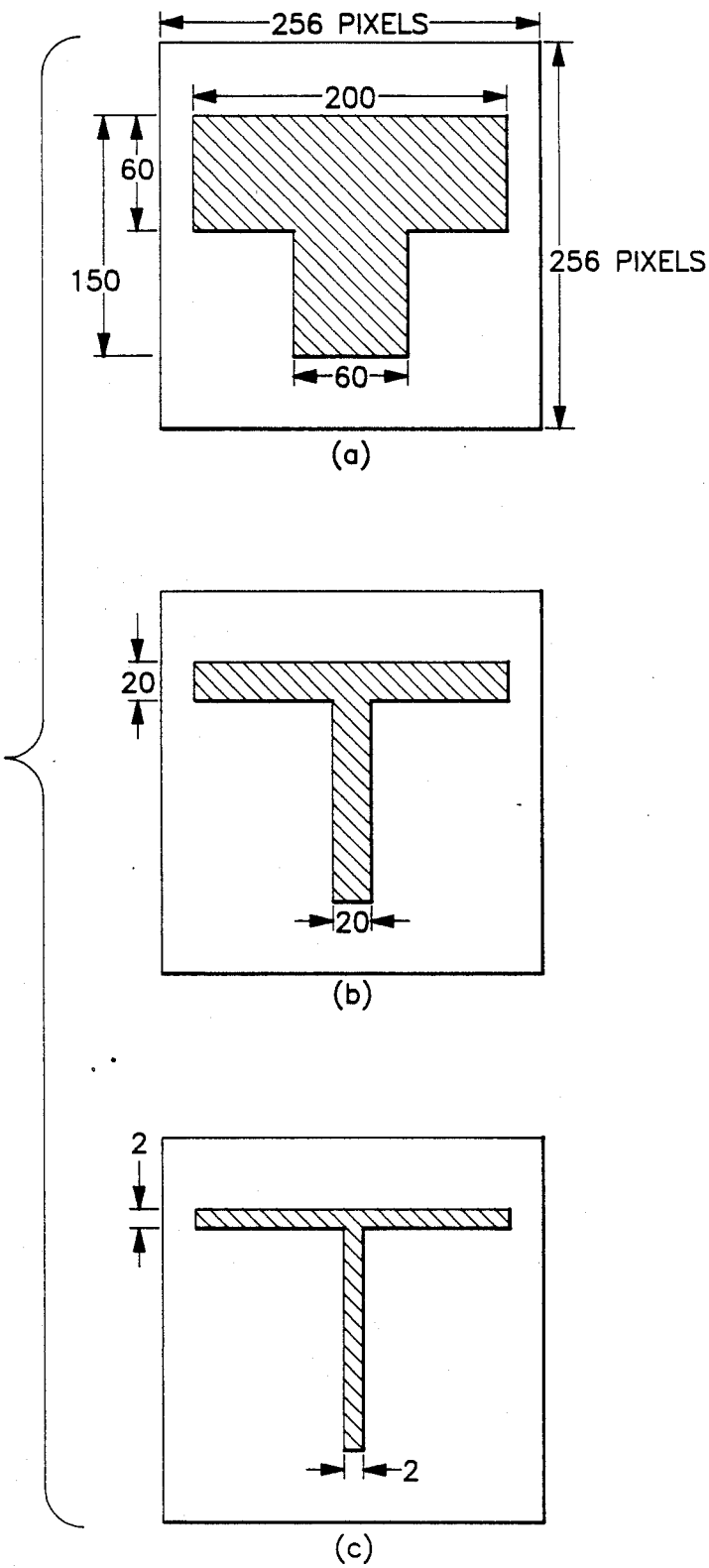
FIG. 6 shows examples of minimum feature sizes of patterns which may be centered in accordance with the invention.

If there is no noise in the image, then the centering phase performs equally well for all patterns. The limitation on minimum feature size is important for noise tolerance and, to investigate this limitation, comparisons of centering on three patterns which were similar to each other except for feature size were undertaken. The patterns are shown in FIG. 5. A pattern was positioned at a randomly determined location in the image and the entire image was corrupted with a controlled amount of random uniform noise varied from 1 to 50 percent. The centering algorithm was then executed on the image and the position of the center, with reference to the pattern, was compared with the center produced on the noise-free pattern. FIG. 6 shows the results of this experiment. The centering error is the Cartesian distance between the actual and ideal centers and three curves are drawn for minimum feature sizes of 60, 20 and 2 pixels. For the largest feature size, the centering error is within two pixels for up to a 10% perturbation, and within 5 pixels for up to a 35% perturbation. The maximum amount of noise that can be tolerated with reasonable results is around 40%. With a feature size of 20, the errors are more pronounced, especially for high noise percentages, and the upper bound on usefulness is around 35%. The third curve shows that the scheme does not work at all for feature sizes as small as 2 pixels.

The above results are easily explained. With large feature sizes, more units in the window are ON, and therefore there are more contributions to the shift units U, D, R and L of the shift unit assembly 26. Also, the location of the center does not depend critically on a few units. Thus if some units are inverted, it is less likely that the center will be repositioned by any significant amount. With small feature sizes, on the other hand, even a small amount of noise could affect the calculation of the center.

Figure 7:
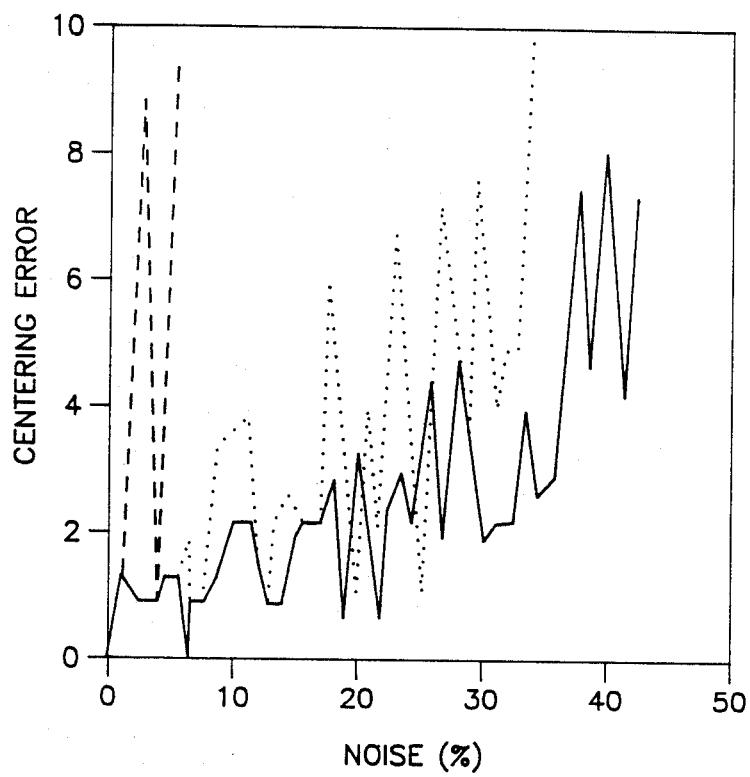
FIGS. 7 and 8 are graphs showing the respective effects of noise on the centering process and the subsequent associative match.
Figure 8:
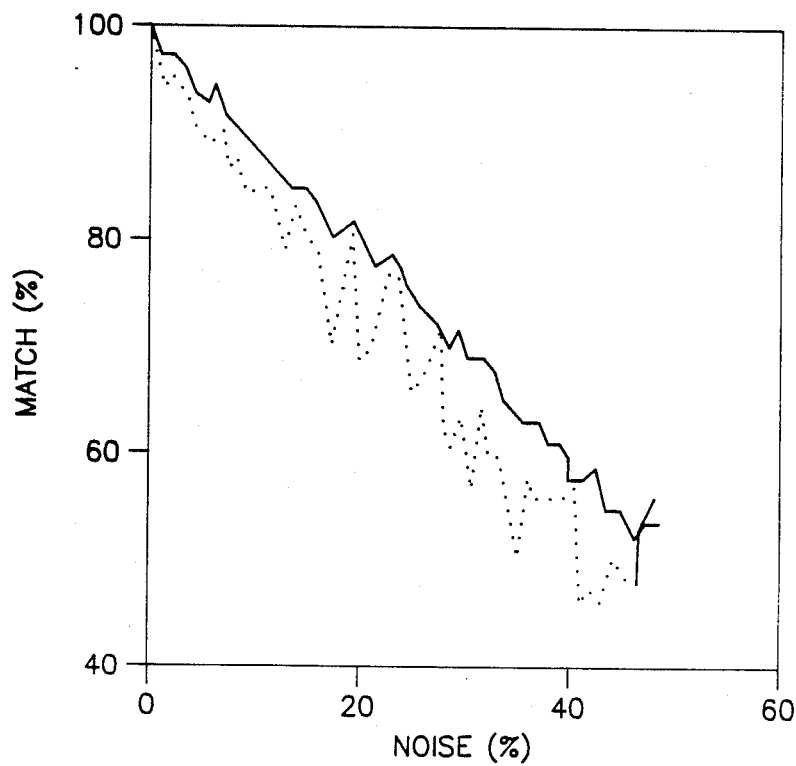

FIG. 7 shows the noise-tolerance of the centering scheme. However, it in itself does not quantify how noise affects the recognition of a pattern in this model of translation-invariance recognition. The translation-invariance recognition scheme is a two-phase scheme. The centering process, which is the subject of the invention herein, runs first and its result is used for an associative match against stored patterns. Centering also precedes storage as stored patterns are first centered in the window. The associative match is performed by an associative memory. An associative memory should respond to a noisy version of a stored pattern in a manner identical to its response to the pattern itself. For example, in a hetero-associative memory, if a pattern is associated with a category, then a noisy version of a pattern should be associated with the same category as the noise-free pattern. In an auto-associative memory, the response to a noisy version of a pattern should be the noise-free pattern-the pattern should be corrected or completed. An important standard for measuring the performance of an associative memory is the amount of noise for which it can compensate.

With this two-phase model, it is essential that the centering process not affect the performance of the matching process. In particular, if an image is corrupted by some given amount of noise, then the noise "seen" be the associative memory should not be significantly greater than this amount. Ideally, the centering process should not contribute any noise, and an image with x percent noise should require that the associative memory correct for x percent noise.

FIG. 7 shows that this is indeed the case if the assumption of a large minimum feature size holds. The horizontal axis here is again the amount of noise injected into the image. The vertical axis is the match between the window corresponding to the centered pattern in the noisy image and the window corresponding to the noise-free, perfectly centered pattern. The match was not a pixel-by-pixel match for the entire window because much of the window is the "background" and should not be considered. Instead, the match indicates the percentage of ON units in the noise-free centered window that were also ON in the noisy centered window. This criterion has its own drawbacks because it can result in an incorrect identification if one stored pattern completely contains another.

The curve for the feature size of 60 is close to linear and quite smooth. The curve for the feature size of 20 is slightly worse, and much less predictable. The "jaggedness" of the curve is an indication of the effect of the random noise component. As can be seen, larger feature sizes imply more consistent performance which is true for FIG. 6 as well.

One assumption in the above experiment that needs to be emphasized is that it is assumed that the random noise is uniformly distributed. The results for more localized noise will certainly not be as impressive. If one portion of a pattern is highly noisy, and the rest of the pattern is noise-free, then it can be expected that the centering scheme will not work as well.

REFERENCES

Hinton, G.E., and J.A. Anderson (Eds.), 1981, Parallel Models of Associative Memory, Lawrence Erlbaum Publishers.

Hopfield, J.J., 1982, "Neural networks and physical systems with emergent collective computational abilities", Proceedings of the National Academy of Sciences U.S.A.

Fahlman, S.E., G.E. Hinton, and T.J. Sejnowski, 1983, "Massively parallel architectures for AI: NETL, THISTLE, and Boltzmann Machines", Proceedings of the Second National Conference on Artificial Intelligence, pp. 109–113.

Fukushima, K., 1980, "Neocognition: A self-organizing neural network model for a mechanism of pattern recognition unaffected by shift in position", Biological Cybernetics, Vol. 36, pp. 193–202.

Kossler, S.M., and S.P. Shwartz, 1978, "Visual images as spatial representations in active memory", Proceedings of the Workshop on Computer Vision Systems, Academic Press.

von der Malsburg, C., and E. Bienenstock, 1986, "Statistical coding and short-term synaptic plasticity: A scheme for knowledge representation in the brain", in Disordered Systems and Biological Organization, E. Bienenstock et al, (Eds.), Springer-Verlag.

Rumelhart, D.E., G.E. Hinton, and R.J. Williams, 1985, Learning internal representations by error propagation, ICS Report 8506, Institute for Cognitive Science, University of California San Diego.

Schenker, P.S., 1981, Toward the Robot Eye: (in search of) an Isomorphic Image Transform for Machine Vision, Technical Report # ENG RV 81-1, Division of Engineering, Brown University.

Sejnowski, T.J., P.K, Kienker, and G.E. Hinton, 1986. "Learning symmetry groups with hidden units: beyond the Perception", Physica 22D, pp. 260–275.

Shepard, R.N., and L.N. Cooper, 1982, Mental Transformations, MIT Press.

Widrow, B., 1987, "The original adaptive neural net broombalancer", Proceedings of the 1987 IEEE International Symposium on Circuits and Systems.

It is claimed:

1. A camera assembly, comprising, a movable camera unit of the type used for image acquisition which has (1) adjusting means for the up, down, left and right movements of a field of view window thereof relative to an image and (2) a two dimensional window projection on the focal plane thereof comprising an array of photosensitive transducer elements which convert sensed optical values to voltages for representing acquired image data in the form of pixels, said array of transducer elements being logically arranged in the form of a two-dimensional matrix with an "i" and "j" axes cartesian coordinates format, said transducer elements having output voltages $i_i$, j, neural type weight means for each of said transducer elements having respective weight values corresponding to the "i" and "j" coordinate values related thereto, camera movement shift means comprising right, left, up and down shift units with all of said shift units being connected via said weight means to each of said transducer elements, said shift units being connected respectively to said camera unit adjusting means and having output shift signals derived from said output voltages and said "i" and "j" coordinate values for iteratively moving said camera unit in directions relative to said pattern to effect at least substantial centering of said pattern relative to said field of view window, said weight values being positive values corresponding to the absolute values of said coordinate values.

2. A camera assembly according to claim 1 wherein said output signals are in accordance with the equations:

$$o_{right} \text{ if } \sum_{i,j} o_{i,j} i > 0 \tag{1}$$

$$o_{left} \text{ if } \sum_{i,j} o_{i,j} i < 0 \tag{2}$$

$$o_{up} \text{ if } \sum_{i,j} o_{i,j} j > 0 \tag{3}$$

$$o_{down} \text{ if } \sum_{i,j} o_{i,j} j < 0 \tag{4}$$

3. A camera assembly according to claim 1 wherein said weight means are resistors.

4. A camera assembly according to claim 1 wherein said shift units are comparators.

* * * * *